(12) United States Patent
Nathan et al.

(10) Patent No.: US 9,464,640 B2
(45) Date of Patent: Oct. 11, 2016

(54) MOTOR-PUMP UNIT

(71) Applicant: Alfred Kärcher GmbH & Co. KG, Winnenden (DE)

(72) Inventors: Robert Nathan, Backnang (DE); Bernhard Gruber, Ingersheim (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 210 days.

(21) Appl. No.: 14/176,737

(22) Filed: Feb. 10, 2014

(65) Prior Publication Data

US 2014/0154112 A1   Jun. 5, 2014

Related U.S. Application Data

(63) Continuation of application No. PCT/EP2011/064026, filed on Aug. 15, 2011.

(51) Int. Cl.

| | |
|---|---|
| *F04B 39/06* | (2006.01) |
| *F04D 29/58* | (2006.01) |
| *F04B 1/12* | (2006.01) |
| *F04B 17/03* | (2006.01) |
| *F04B 17/06* | (2006.01) |
| *F04B 53/08* | (2006.01) |
| *H02K 5/20* | (2006.01) |
| *H02K 7/14* | (2006.01) |
| *H02K 9/19* | (2006.01) |

(52) U.S. Cl.
CPC ............. *F04D 29/588* (2013.01); *F04B 1/122* (2013.01); *F04B 17/03* (2013.01); *F04B 17/06* (2013.01); *F04B 39/064* (2013.01); *F04B 53/08* (2013.01); *H02K 5/20* (2013.01); *H02K 7/14* (2013.01); *H02K 9/19* (2013.01); *B08B 2203/0223* (2013.01)

(58) Field of Classification Search
CPC ........ F04B 1/122; F04B 17/03; F04B 17/06; F04B 39/064; F04B 53/08; F04D 29/588; H02K 5/20; H02K 7/14; H02K 9/19; B08B 2203/0223

See application file for complete search history.

(56) References Cited

U.S. PATENT DOCUMENTS

| | | | |
|---|---|---|---|
| 4,480,967 A | 11/1984 | Schulze | |
| 4,922,148 A | 5/1990 | Kitamura | |
| 6,218,747 B1 * | 4/2001 | Tsuruhara | ....................... 310/54 |
| 6,554,586 B1 * | 4/2003 | Lustwerk | ....................... 417/366 |
| 7,466,053 B1 * | 12/2008 | Radev | ........................... 310/114 |

(Continued)

FOREIGN PATENT DOCUMENTS

| | | |
|---|---|---|
| DE | 81 11 792.2 | 8/1981 |
| DE | 35 45 665 | 7/1987 |

(Continued)

*Primary Examiner* — Peter J Bertheaud
*Assistant Examiner* — Dnyanesh Kasture
(74) *Attorney, Agent, or Firm* — Womble Carlyle Sandridge & Rice LLP

(57) ABSTRACT

A motor-pump unit includes an electric motor and a pump. The electric motor has a motor housing, on the outside of which a cooling channel is arranged. The pump has a suction inlet and a pressure outlet. Liquid to be pressurized can be fed by way of the cooling channel to the suction inlet. In order that the motor-pump unit can be produced and assembled more cost-effectively, the motor housing includes a first housing part and a second housing part, which are connectable to each other in a liquid-tight manner and between them form the cooling channel.

11 Claims, 2 Drawing Sheets

(56) References Cited

U.S. PATENT DOCUMENTS

2010/0047091 A1* 2/2010 Schiffhauer et al. ...... 417/410.1
2012/0034111 A1   2/2012 Schiffhauer et al.

FOREIGN PATENT DOCUMENTS

| | | |
|---|---|---|
| DE | 36 03 423 | 8/1987 |
| DE | 37 38 592 | 5/1989 |
| DE | 94 17 662 | 12/1994 |
| DE | 10 2009 010 461 | 8/2010 |
| JP | 63-257434 | 10/1988 |
| JP | 2001025210 | 1/2001 |
| JP | 2009213218 | 9/2009 |

* cited by examiner

MOTOR-PUMP UNIT

CROSS-REFERENCE TO RELATED APPLICATIONS

This application is a continuation of international application number PCT/EP2011/064026, filed on Aug. 15, 2011, which is incorporated herein by reference in its entirety and for all purposes.

BACKGROUND OF THE INVENTION

The invention relates to a motor-pump unit for a high-pressure cleaning appliance with an electric motor having a motor housing, on the outside of which a cooling channel is arranged, and with a pump driven by the electric motor and having a suction inlet for taking in liquid to be pressurized and a pressure outlet for discharging pressurized liquid, liquid to be pressurized being fed by way of the cooling channel to the suction inlet.

By means of such motor-pump units, a cleaning liquid, preferably water, can be pressurized and subsequently directed at an article to be cleaned. For this purpose, in particular, a high-pressure hose carrying, for example, a spray gun or a spray lance at its free end can be connected to the pressure outlet of the pump.

The electric motor is often cooled by a flow of air which is preferably directed past the exterior of the motor housing. However, this requires considerable heat exchanger surfaces and so air cooling is only possible with spatially extended motor-pump units.

In DE 81 11 792 U1, it is proposed that liquid cooling be provided for the electric motor in addition to air cooling. A steel pipe helically surrounding the stator of the electric motor is embedded for this purpose in the housing wall of the motor housing. However, the embedding of a steel pipe in the housing wall of the motor housing requires considerable production expenditure and involves substantial costs.

In DE 35 45 665 C2, it is proposed that the motor housing be constructed in the shape of a pot and a plastic hood also configured in the shape of a pot be placed on the motor housing to form a cavity between the motor housing and the plastic hood. Cooling liquid can be fed by way of an inlet connector to the cavity. The cooling liquid can be discharged from the cavity by way of an outlet connector and then fed to the suction inlet. In such a configuration, the motor housing is surrounded by cooling liquid and so the electric motor can be effectively cooled without provision of a flow of air and can, consequently, be of compact design. However, the provision of the cavity for the cooling liquid requires an additional plastic hood, which has to be placed on the motor housing in an additional assembly step.

The object of the present invention is to so develop a motor-pump unit of the kind mentioned at the outset that it can be produced and assembled more cost-effectively.

SUMMARY OF THE INVENTION

This object is accomplished, in accordance with the invention, in a motor-pump unit of the generic kind in that the motor housing comprises a first housing part and a second housing part, which are connectable to each other in a liquid-tight manner and between them form the cooling channel.

In the motor-pump unit in accordance with the invention, the cooling channel is formed by joining together a first housing part and a second housing part of the motor housing. For this purpose, the motor housing comprises a first housing part, preferably facing the pump, and a second housing part, preferably facing away from the pump. The two housing parts can be joined together to form the motor housing, and in the joined state they jointly form the cooling channel to which liquid can be fed for cooling purposes and can subsequently be pressurized by the pump.

The motor-pump unit in accordance with the invention is characterized by cost-effective production and simple assembly as provision of the cooling channel merely requires the two housing parts of the motor housing to be joined together.

The cooling channel has an inlet and an outlet. Liquid can be fed to the cooling channel by way of the inlet. A supply hose, for example, can be connected to the inlet. The outlet can be connected by way of a connection line to the suction inlet of the pump so that the liquid fed to the cooling channel by way of the inlet can flow out of the cooling channel by way of the outlet and be subsequently fed to the suction inlet of the pump.

The cooling channel preferably extends in the circumferential direction of the electric motor. The cooling channel can surround the electric motor in the circumferential direction.

At least one sealing element which is arranged between the first housing part and the second housing part is advantageously used for flow-tight connection of the first housing part to the second housing part. The sealing element can, for example, be configured in the form of an O-ring.

It is advantageous for two sealing elements, which each completely surround the electric motor in the circumferential direction and which seal the cooling channel at a radial outer side and a radial inner side, to be arranged between the first housing part and the second housing part.

In an advantageous embodiment of the motor-pump unit in accordance with the invention, particularly simple assembly is achieved by the first housing part and the second housing part being adapted to be joined together in the axial direction in relation to the longitudinal axis of the electric motor, thereby forming the cooling channel.

It is expedient for at least one of the two housing parts to be of pot-shaped configuration and to be directed with its free end face against the other housing part.

It is particularly advantageous for both the first housing part and the second housing part to be of pot-shaped construction and for the two housing parts to be directed with their free end faces against each other.

If the two housing parts are adapted to be axially joined together, then at least one of the two housing parts can form at its end face facing the other housing part an annular receptacle which surrounds the electric motor in the circumferential direction and in the joined state of the two housing parts is covered in a liquid-tight manner by the other housing part, thereby forming the cooling channel.

It is advantageous for the first housing part and/or the second housing part to form a bearing shield on which a motor shaft of the electric motor is mounted for rotation.

It is particularly advantageous for both the first housing part and the second housing part to each form a bearing shield on which the motor shaft is mounted for rotation. The bearing shields can comprise a receptacle for receiving a bearing, preferably a ball bearing, for the motor shaft.

The first housing part and/or the second housing part is/are preferably shrunk onto a stator of the electric motor.

It may be provided that both housing parts are shrunk onto the stator of the electric motor.

Alternatively, it may be provided that only the first housing part or only the second housing part is shrunk onto the stator. The shrinking of only one of the two housing parts results in further simplification of assembly of the motor-pump unit in accordance with the invention.

It is expedient for the first housing part and/or the second housing part to comprise a side wall surrounding the electric motor in the circumferential direction and a bottom wall covering the electric motor at an end face, with an area of the side wall that is adjacent to the cooling channel having a larger wall thickness than the bottom wall. Such a configuration has the advantage that in the area adjacent to the cooling channel, the motor housing has a relatively large wall thickness which imparts a high heat conductivity to the motor housing so that waste heat from the electric motor can be conducted particularly effectively by way of the area of the side wall of larger wall thickness to the cooling channel, from which the waste heat can be dissipated by way of the liquid flowing through the cooling channel. In areas of the motor housing at a larger distance from the cooling channel, on the other hand, the wall thickness of the motor housing is kept lower. The weight of the motor housing can be thereby reduced, and the amount of material used for producing the motor housing can also be reduced. This lowers the production costs.

It is particularly advantageous if both the first housing part and the second housing part comprise a side wall surrounding the electric motor in the circumferential direction and a bottom wall covering the electric motor at an end face, with both housing parts having a larger material thickness in an area of the side wall that is adjacent to the cooling channel than in the area of their respective bottom wall.

For provision of the cooling channel, the first housing part and the second housing part in an advantageous embodiment of the invention each comprise a cooling channel wall, the cooling channel walls being connectable to each other in a liquid-tight manner and forming between them the cooling channel when the two housing parts are joined together. The two cooling channel walls delimit the cooling channel which they form between them. When the two housing parts are joined together, the cooling channel walls abut in a liquid-tight manner against each other, preferably with at least one sealing element positioned between them.

At least one cooling channel wall is expediently of groove-shaped configuration. It may be provided that only the cooling channel wall of one of the two housing parts has a groove-shaped configuration, while the other cooling channel wall only forms a cover which covers the groove-shaped channel wall in a liquid-tight manner. Alternatively, it may be provided that both housing parts each form a groove-shaped cooling channel wall, with the groove-shaped cooling channel walls abutting against each other at their end faces, expediently with at least one sealing element positioned between them, when the two housing parts are joined together.

In a particularly preferred configuration of the invention, the first housing part and the second housing part form between them a drainage channel which has at least one outlet opening and is arranged between the cooling channel and the electric motor. In such a configuration, a drainage channel is used in addition to the cooling channel. Like the cooling channel, the drainage channel is formed by the two housing parts of the motor housing. The cooling channel is arranged at the radial outer side of the drainage channel. This has the advantage that in the event of a leak in the cooling channel, liquid cannot get directly to the live components of the electric motor. Rather, in the event of a leak in the cooling channel, either the liquid gets directly to the exterior surrounding the motor housing or it flows into the drainage channel, which is arranged between the cooling channel and the electric motor, and by way of the at least one outlet opening of the drainage channel can then get to the exterior surrounding the electric motor and be recognized there by the user. Therefore, also in the event of a leak in the cooling channel, the liquid flowing through the cooling channel has no direct access to the live components of the electric motor and therefore also in the event of a leak in the cooling channel, any endangering of the user can be reliably excluded. Such a leak could be caused by corrosion of the wall of the cooling channel, for example.

Expediently, at least one sealing element, for example, an O-ring, is arranged between the cooling channel and the drainage channel. Should the sealing element arranged between the cooling channel and the drainage channel lose its tightness, this results merely in liquid being able to flow out of the cooling channel into the drainage channel. As the drainage channel has at least one outlet opening, the liquid gets to the exterior surrounding the electric motor, in the event of leakage of the sealing element, and can then be recognized by the user.

In a preferred configuration of the invention, the first housing part and the second housing part each comprise a drainage channel wall, the drainage channel walls being connectable to each other in a liquid-tight manner and forming between them the drainage channel when the two housing parts are joined together.

It is expedient for the two drainage channel walls to overlap each other in the axial direction. For example, it may be provided that the two drainage channel walls each comprise a radial wall section and an axial wall section, with the radial wall sections being arranged in spaced relation to each other in the axial direction and the axial wall sections arranged in radially spaced relation to each other. The axial wall section of one of the two housing parts surrounds the axial wall section of the other housing part. An annular space, which forms the drainage channel, extends between the axial and radial wall sections.

The first housing part and/or the second housing part is/are preferably made of metal. In particular, it may be provided that both housing parts are constructed as aluminum or zinc diecastings. This makes it possible for the motor housing to be produced cost-effectively and also has the advantage that waste heat from the electric motor can be dissipated particularly effectively to the liquid flowing through the cooling channel.

The following description of a preferred embodiment of the invention will serve in conjunction with the drawings for further explanation.

DETAILED DESCRIPTION OF THE INVENTION

Figure 1:
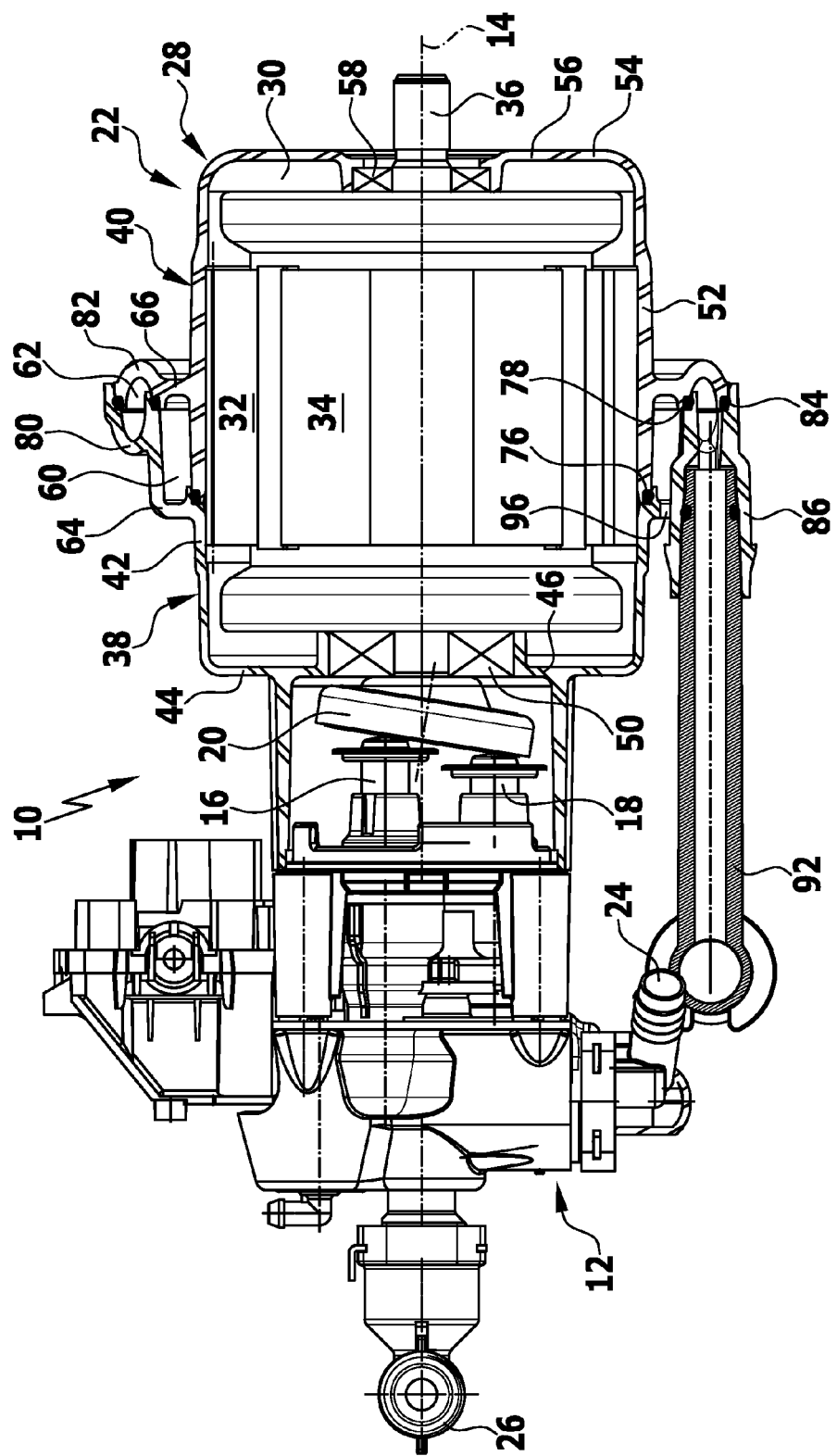
FIG. 1 is a side view, partially sectional, of a motor-pump unit in accordance with the invention.

A motor-pump unit 10 in accordance with the invention, which is used in high-pressure cleaning appliances, is shown schematically in the drawings. It comprises a pump 12 which, in the illustrated embodiment, is constructed as a piston pump and comprises several pistons movable back and forth parallel to the longitudinal axis 14 of the motor pump unit 10. A first piston 16 and a second piston 18 are shown in FIG. 1. The pistons 16, 18 abut against a swash plate 20, which is made to rotate by an electric motor 22. The pistons 16, 18 each project in the usual manner into a pumping chamber, not shown in the drawings in order to provide a better overview, so that during the movement of the pistons 16, 18 back and forth, liquid which is to be pressurized by the pump 12 can be taken in by a suction inlet 24 of the pump 12 and discharged by way of a pressure outlet 26 of the pump. A pressure hose, not shown in the drawings, carrying at its free end a spray gun or a spray lance, for example, can be connected in the usual manner to the pressure outlet 26. This makes it possible for a user to direct the pressurized liquid at an article for cleaning purposes.

The electric motor 22 comprises a motor housing 28 which surrounds an interior 30. Arranged in the interior 30 is a stator 32 of the electric motor 22, which surrounds a rotor 34 of the electric motor 22 in the usual manner. The rotor 34 is rotationally fixedly held on a motor shaft 36 aligned collinearly with the longitudinal axis 14. As already explained above, the swash plate 20 can be made to rotate by way of the motor shaft 36 in order to drive the pump 12.

The motor housing 28 is of two-part construction. It comprises a first housing part 38 which faces the pump 12, and a second housing part 40 which faces away from the pump 12. The first housing part 38 is of pot-shaped configuration and comprises a first side wall 42 which protrudes from a first bottom wall 44 in the direction towards the second housing part 40. The first bottom wall 44 forms a first bearing shield 46 on which the motor shaft 36 is mounted for rotation by means of a first bearing 50.

The second housing part 40 is also of pot-shaped configuration and comprises a second side wall 52 which surrounds the stator 32 in the circumferential direction and, in the axial direction, facing the first housing part 38, protrudes from a second bottom wall 54 of the second housing part 40. The second bottom wall 54 forms a second bearing shield 56 on which the motor shaft 36 is mounted for rotation by way of a second bearing 58.

The first housing part 38 forms in combination with the second housing part 40 a drainage channel 60 surrounding the electric motor 22 in the circumferential direction and a cooling channel 62 surrounding the electric motor 22 in the circumferential direction. The drainage channel 60 is arranged in the radial direction between the cooling channel 62 and the electric motor 22. It is formed by a first drainage channel wall 64 of the first housing part 38 and a second drainage channel wall 66 of the second housing part 40. The first drainage channel wall 64 comprises a radial wall section 68 which is radially aligned in relation to the longitudinal axis 14 of the motor pump unit 10 and is adjoined by an axial wall section 70. In a corresponding manner, the second drainage channel wall 66 comprises a radial wall section 72 and an axial wall section 74. The axial wall section 70 of the first drainage channel wall 64 surrounds the axial wall section 74 of the second drainage channel wall 66, thereby forming an annular space in the form of the drainage channel 60. The drainage channel 60 is, therefore, delimited in the axial direction by the two radial wall sections 68 and 72 and in the radial direction by the two axial wall sections 70 and 74. A first sealing element in the form of a first sealing ring 76 is arranged between the axial wall section 74 of the second drainage channel wall 66 and the radial wall section 68 of the first drainage channel wall 64, and a second sealing element in the form of a second sealing ring 78 is arranged between the radial wall section 72 of the second drainage channel wall 66 and the axial wall section 70 of the first drainage channel wall 64. The drainage channel 60 is sealed in a liquid-tight manner by means of the two sealing rings 76 and 78.

In the illustrated embodiment, the cooling channel 62 is formed by a groove-shaped first cooling channel wall 80 of the first housing part 38 and a groove-shaped second cooling channel wall 82 of the second housing part 40. The first cooling channel wall 80 adjoins the axial wall section 70 of the first drainage channel wall 64 in the radial direction, and the second cooling channel wall 82 adjoins the radial wall section 72 of the second drainage channel wall 66 in the radial direction. A third sealing element in the form of a third sealing ring 84 is arranged at a radial spacing from the second sealing ring 78 between the first cooling channel wall 80 and the second cooling channel wall 82. The cooling channel 62 is, therefore, sealed by the second sealing ring 78 and the third sealing ring 84.

Figure 2:
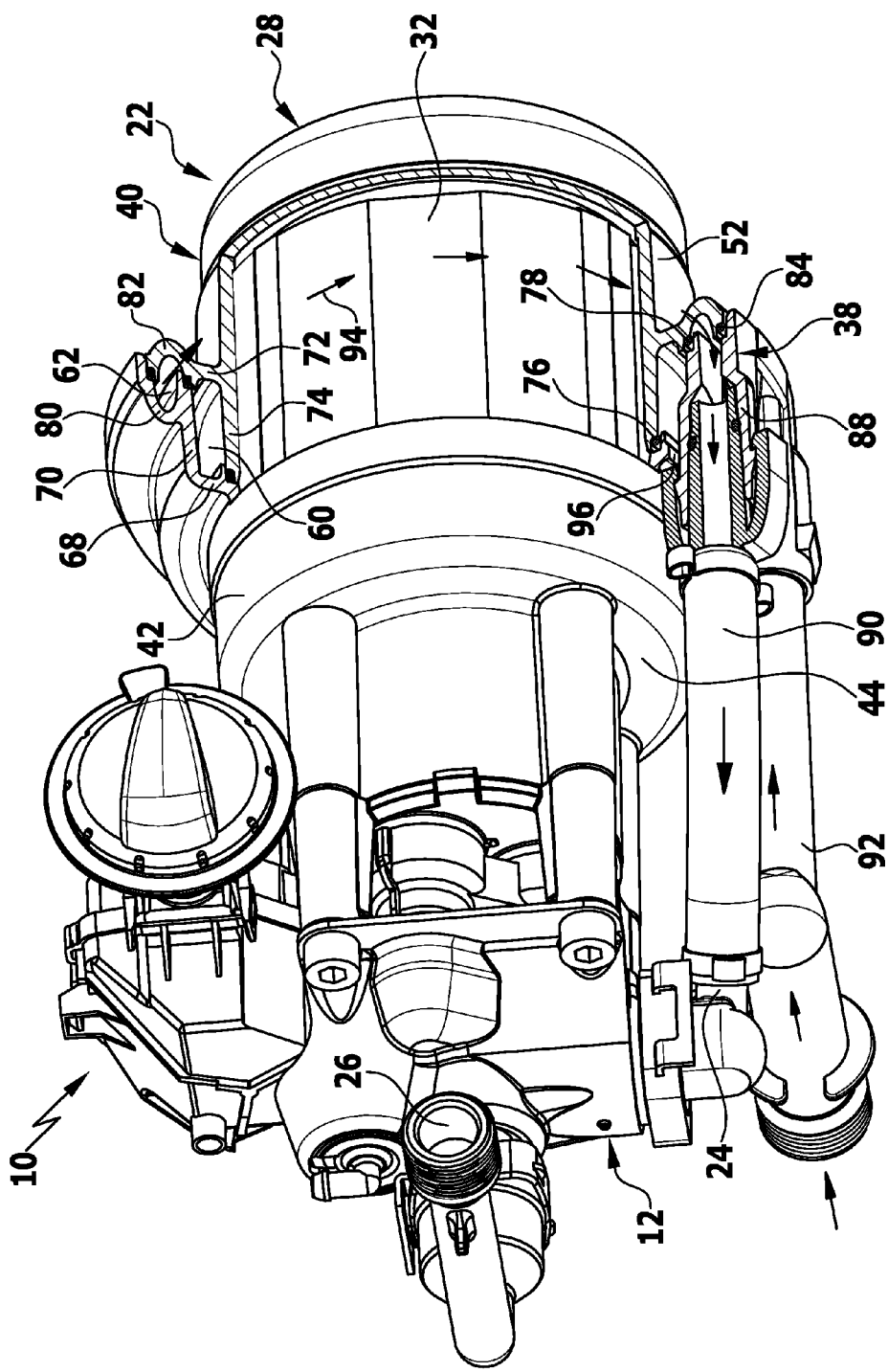
FIG. 2 is a perspective representation, partially cut-open, of the motor-pump unit from FIG. 1.

Liquid can be fed to the cooling channel 62 by way of a cooling channel inlet 86 shown in FIG. 1. The liquid flows through the cooling channel 62 and can be discharged by way of a cooling channel outlet 88 shown in FIG. 2. Connected to the cooling channel outlet 88 is a connection line 90 which connects the cooling channel outlet 88 to the suction inlet 24 of the pump 12. Connected to the cooling channel inlet 86 is an inlet line 92 to which a supply line, for example, a hose, can be connected. Therefore, liquid which is to be pressurized by the pump 12 can be fed to the pump 12 by way of the inlet line 92, the cooling channel 62 and the connection line 90, pressurized by the pump 12 and then discharged by way of the pressure outlet 26. The direction of flow of the liquid is illustrated by the arrows 94 in FIG. 2. The liquid flowing through the cooling channel 62 absorbs waste heat from the electric motor 22 so that the latter can be effectively cooled. In order to improve the heat conductivity of the motor housing 28, the wall thickness of the second side wall 52 and the first side wall 42 in the area adjacent to the drainage channel 60 and the cooling channel 62 is chosen larger than the wall thickness of the first bottom wall 44 and the second bottom wall 54. This will be clear, in particular, from FIG. 1.

The drainage channel 60 comprises in the area of the radial wall section 68 of the first drainage channel wall 64 several outlet openings, one outlet opening 96 being discernible in the drawings. If a leak in the motor housing 28 occurs in the area of the cooling channel 62, either the liquid flowing through the cooling channel 62 gets directly to the exterior surrounding the electric motor 22 where it can be recognized by the user who can then put the motor-pump unit 10 out of operation, or the liquid gets into the drainage channel 60 out of which it can, in turn, flow by way of the outlet openings 96 to the exterior surrounding the electric motor 22. The drainage channel 60 arranged between the cooling channel 62 and the electric motor 22, therefore, ensures that also in the event of a leak in the cooling channel 62, liquid is unable to get into the interior 30 of the motor housing 28. Any endangering of the user by liquid coming into contact with live parts of the electric motor 22 is, therefore, excluded. If, for example, leakage of the second sealing ring 78 occurs, then liquid flows out of the cooling channel 62 only into the drainage channel 60, but not into the interior 30 of the motor housing 28.

To assemble the electric motor 22, the first housing part 38 and the second housing part 40 can be shrunk in opposed relation to each other onto the stator 32 of the electric motor 22, and with the first sealing ring 76, the second sealing ring 78 and the third sealing ring 84 placed between them, they lie with their end face against each other in a liquid-tight manner, thereby forming the drainage channel 60 and the cooling channel 62. Assembly is, therefore, very easy.

The invention claimed is:

1. A motor-pump unit for a high-pressure cleaning appliance, comprising an electric motor having a motor housing, on the outside of which a cooling channel is arranged, and comprising a pump driven by the electric motor and having a suction inlet for taking in liquid to be pressurized and a pressure outlet for discharging pressurized liquid, liquid to be pressurized being fed by way of the cooling channel to the suction inlet, wherein the motor housing comprises a first housing part and a second housing part, which are connectable to each other in a liquid-tight manner and between them form the cooling channel, wherein the first housing part and the second housing part further form between them a drainage channel which has at least one outlet opening and is arranged between the cooling channel and the electric motor, and wherein the at least one outlet opening of the drainage channel is adapted to guide liquid from the drainage channel to an exterior surrounding the motor housing so that the liquid is visible by a user.

2. The motor-pump unit in accordance with claim 1, wherein the first housing part and the second housing part are adapted to be joined together in the axial direction in relation to the longitudinal axis of the motor-pump unit, thereby forming the cooling channel.

3. The motor-pump unit in accordance with claim 1, wherein at least one of the first housing part and the second housing part forms a bearing shield on which a motor shaft of the electric motor is mounted for rotation.

4. The motor-pump unit in accordance with claim 1, wherein at least one of the first housing part and the second housing part is shrunk onto a stator of the electric motor.

5. The motor-pump unit in accordance with claim 1, wherein at least one of the first housing part and the second housing part comprises a side wall surrounding the electric motor in the circumferential direction and a bottom wall covering the electric motor at an end face, with an area of the side wall that is adjacent to the cooling channel having a larger wall thickness than the bottom wall.

6. The motor-pump unit in accordance with claim 1, wherein the first housing part and the second housing part each comprise a cooling channel wall, the cooling channel walls being connectable to each other in a liquid-tight manner and forming between them the cooling channel when the two housing parts are joined together.

7. The motor-pump unit in accordance with claim 6, wherein at least one cooling channel wall is of groove-shaped configuration.

8. The motor-pump unit in accordance with claim 1, wherein at least one sealing element is arranged between the cooling channel and the drainage channel.

9. The motor-pump unit in accordance with claim 1, wherein the first housing part and the second housing part each comprise a drainage channel wall, the drainage channel walls being connectable to each other in a liquid-tight manner and forming between them the drainage channel when the two housing parts are joined together.

10. The motor-pump unit in accordance with claim 9, wherein the two drainage channel walls overlap each other in an axial direction.

11. The motor-pump unit in accordance with claim 1, wherein at least one of the first housing part and the second housing part is made of metal.

* * * * *